United States Patent
Meier et al.

(10) Patent No.: US 7,491,317 B2
(45) Date of Patent: Feb. 17, 2009

(54) DESULFURIZATION IN TURBULENT FLUID BED REACTOR

(75) Inventors: Paul F. Meier, Bartlesville, OK (US); Max W. Thompson, Sugar Land, TX (US); Victor G. Hoover, Pearl River, LA (US); Guido R. Germana, Katy, TX (US)

(73) Assignee: China Petroleum & Chemical Corporation, Beijing (CN)

( * ) Notice: Subject to any disclaimer, the term of this patent is extended or adjusted under 35 U.S.C. 154(b) by 591 days.

(21) Appl. No.: 11/147,045

(22) Filed: Jun. 7, 2005

(65) Prior Publication Data

US 2006/0272984 A1 Dec. 7, 2006

(51) Int. Cl.
 *C10G 45/02* (2006.01)
(52) U.S. Cl. ............... 208/208 R; 208/243; 208/244; 208/245; 208/246; 208/247; 208/248; 208/249; 208/250

(58) Field of Classification Search ............ None
See application file for complete search history.

(56) References Cited

U.S. PATENT DOCUMENTS

| | | | |
|---|---|---|---|
| 2,458,358 A | 1/1949 | Evans | |
| 2,467,850 A | 4/1949 | Ogorzaly | |
| 2,468,468 A | 4/1949 | Sinclair et al. | |
| 3,256,612 A | 6/1966 | Dollinger | |
| 4,359,968 A | 11/1982 | Stewart | |
| 4,588,790 A | 5/1986 | Jenkins, III et al. | |
| 4,786,368 A | 11/1988 | York et al. | |
| 2003/0194356 A1 | 10/2003 | Meier | |
| 2004/0009108 A1 | 1/2004 | Meier | |
| 2004/0031729 A1 | 2/2004 | Meier | |

*Primary Examiner*—Tam M Nguyen
(74) *Attorney, Agent, or Firm*—Hovey Williams LLP

(57) ABSTRACT

A method and apparatus for removing sulfur from a hydrocarbon-containing fluid stream wherein desulfurization is enhanced by improving the contacting of the hydrocarbon-containing fluid stream and sulfur-sorbing solid particulates in a fluidized bed reactor.

7 Claims, 4 Drawing Sheets

DESULFURIZATION IN TURBULENT FLUID BED REACTOR

BACKGROUND OF THE INVENTION

This invention relates to a method and apparatus for removing sulfur from hydrocarbon-containing fluid streams. In another aspect, the invention concerns a system for improving the contacting of a hydrocarbon-containing fluid stream and sulfur-sorbing solid particulates in a fluidized bed reactor.

Hydrocarbon-containing fluids such as gasoline and diesel fuels typically contain a quantity of sulfur. High levels of sulfurs in such automotive fuels is undesirable because oxides of sulfur present in automotive exhaust may irreversibly poison noble metal catalysts employed in automobile catalytic converters. Emissions from such poisoned catalytic converters may contain high levels of non-combusted hydrocarbons, oxides of nitrogen, and/or carbon monoxide, which, when catalyzed by sunlight, form ground level ozone, more commonly referred to as smog.

Much of the sulfur present in the final blend of most gasolines originates from a gasoline blending component commonly known as "cracked-gasoline." Thus, reduction of sulfur levels in cracked-gasoline will inherently serve to reduce sulfur levels in most gasolines, such as, automobile gasolines, racing gasolines, aviation gasolines, boat gasolines, and the like.

Many conventional processes exist for removing sulfur from cracked-gasoline. However, most conventional sulfur removal processes, such as hydrodesulfurization, tend to saturate olefins and aromatics in the cracked-gasoline and thereby reduce its octane number (both research and motor octane number). Thus, there is a need for a process wherein desulfurization of cracked-gasoline is achieved while the octane number is maintained.

In addition to the need for removing sulfur from cracked-gasoline, there is also a need to reduce the sulfur content in diesel fuel. In removing sulfur from diesel fuel by hydrodesulfurization, the cetane is improved but there is a large cost in hydrogen consumption. Such hydrogen is consumed by both hydrodesulfurization and aromatic hydrogenation reactions. Thus, there is a need for a process wherein desulfurization of diesel fuel is achieved without significant consumption of hydrogen so as to provide a more economical desulfurization process.

Traditionally, sorbent compositions used in processes for removing sulfur from hydrocarbon-containing fluids, such as cracked-gasoline and diesel fuel, have been agglomerates utilized in fixed bed applications. Because fluidized bed reactors present a number of advantages over fixed bed reactors, hydrocarbon-containing fluids are sometimes processed in fluidized bed reactors. Relative to fixed bed reactors, fluidized bed reactors have both advantages and disadvantages. Rapid mixing of solids gives nearly isothermal conditions throughout the reactor leading to reliable control of the reactor and, if necessary, easy removal of heat. Also, the flowability of the solid sorbent particulates allows the sorbent particulates to be circulated between two or more units, an ideal condition for reactors where the sorbent needs frequent regeneration. However, the gas flow in fluidized bed reactors is often difficult to describe, with possible large deviations from plug flow leading to gas bypassing, solids backmixing, and inefficient gas/solids contacting. Such undesirable flow characteristics within a fluidized bed reactor ultimately leads to a less efficient desulfurization process.

SUMMARY OF THE INVENTION

Accordingly, it is an object of the present invention to provide a novel hydrocarbon desulfurization system which employs a fluidized bed reactor having reactor internals which enhance the contacting of the hydrocarbon-containing fluid stream and the regenerable solid sorbent particulates, thereby enhancing desulfurization of the hydrocarbon-containing fluid stream.

A further object of the present invention is to provide a hydrocarbon desulfurization system which minimizes octane loss and hydrogen consumption while providing enhanced sulfur removal.

It should be noted that the above-listed objects need not all be accomplished by the invention claimed herein and other objects and advantages of this invention will be apparent from the following description of the preferred embodiments and appended claims.

Accordingly, in one embodiment of the present invention there is provided a fluidized bed reactor for contacting an upwardly flowing gaseous hydrocarbon-containing stream with solid particulates. The fluidized bed reactor includes an elongated upright vessel which defines a lower reaction zone, an upper disengagement zone, and a series of vertically spaced contact-enhancing members that are generally horizontally disposed in the reaction zone. Solid particulates within the reaction zone are substantially fluidized by the gaseous hydrocarbon-containing stream. The solid particulates are substantially disengaged from the hydrocarbon-containing stream in the disengagement zone. Each of the contact-enhancing members includes a plurality of substantially parallelly extending, laterally spaced, elongated baffles. Each of these elongated baffles present a generally V-shaped cross-section.

In another embodiment of the present invention, there is provided a desulfurization unit comprising a fluidized bed reactor, a fluidized bed regenerator, and a fluidized bed reducer. The fluidized bed reactor defines an elongated upright reaction zone in which finely divided solid sorbent particles are contacted with a hydrocarbon-containing fluid stream to thereby provide a desulfurized hydrocarbon-containing stream and sulfur-loaded sorbent particulates. The fluidized bed reactor also includes a series of vertically spaced contact-enhancing members that are generally horizontally disposed in the reaction zone. Each of the contact-enhancing members includes a plurality of substantially parallelly extending, laterally spaced, elongated baffles. Each of the elongated baffles presents a generally V-shaped cross-section. The fluidized bed regenerator serves to contact at least a portion of the sulfur-loaded sorbent particles with an oxygen-containing regeneration stream to thereby provide regenerated sorbent particulates. The fluidized bed reducer serves to contact at least a portion of the regenerated sorbent particulates with a hydrogen-containing reducing stream.

In another embodiment of the present invention, there is provided a desulfurization process comprising the steps of: (a) contacting a hydrocarbon-containing fluid stream with finely divided solid sorbent particulates comprising a reduced-valence promoter metal component and zinc oxide in a fluidized bed reactor vessel under desulfurization conditions sufficient to remove sulfur from the hydrocarbon-containing fluid stream and convert at least a portion of the zinc oxide to zinc sulfide, thereby providing a desulfurized hydrocarbon-containing stream and sulfur-loaded sorbent particulates; (b) simultaneously with step (a), contacting at least a portion of the hydrocarbon-containing stream and the sorbent particulates with a series of substantially horizontal, vertically spaced baffle groups comprising a plurality of substantially parallel baffles each presenting a generally V-shaped cross-section, thereby reducing axial dispersion in the fluidized bed reactor; (c) contacting the sulfur-loaded sorbent particulates with an oxygen containing regeneration stream in a regenerator vessel under regeneration conditions sufficient to convert at least a portion of the zinc sulfide to zinc oxide, thereby providing regenerated sorbent particulates comprising an unreduced promoter metal component; and (d) contacting the regenerated sorbent particulates with a hydrogen-containing reducing stream in a reducer vessel under reducing conditions sufficient to reduce the unreduced promoter metal component, thereby providing reduced sorbent particulates.

DETAILED DESCRIPTION OF THE PREFERRED EMBODIMENTS

Figure 1:
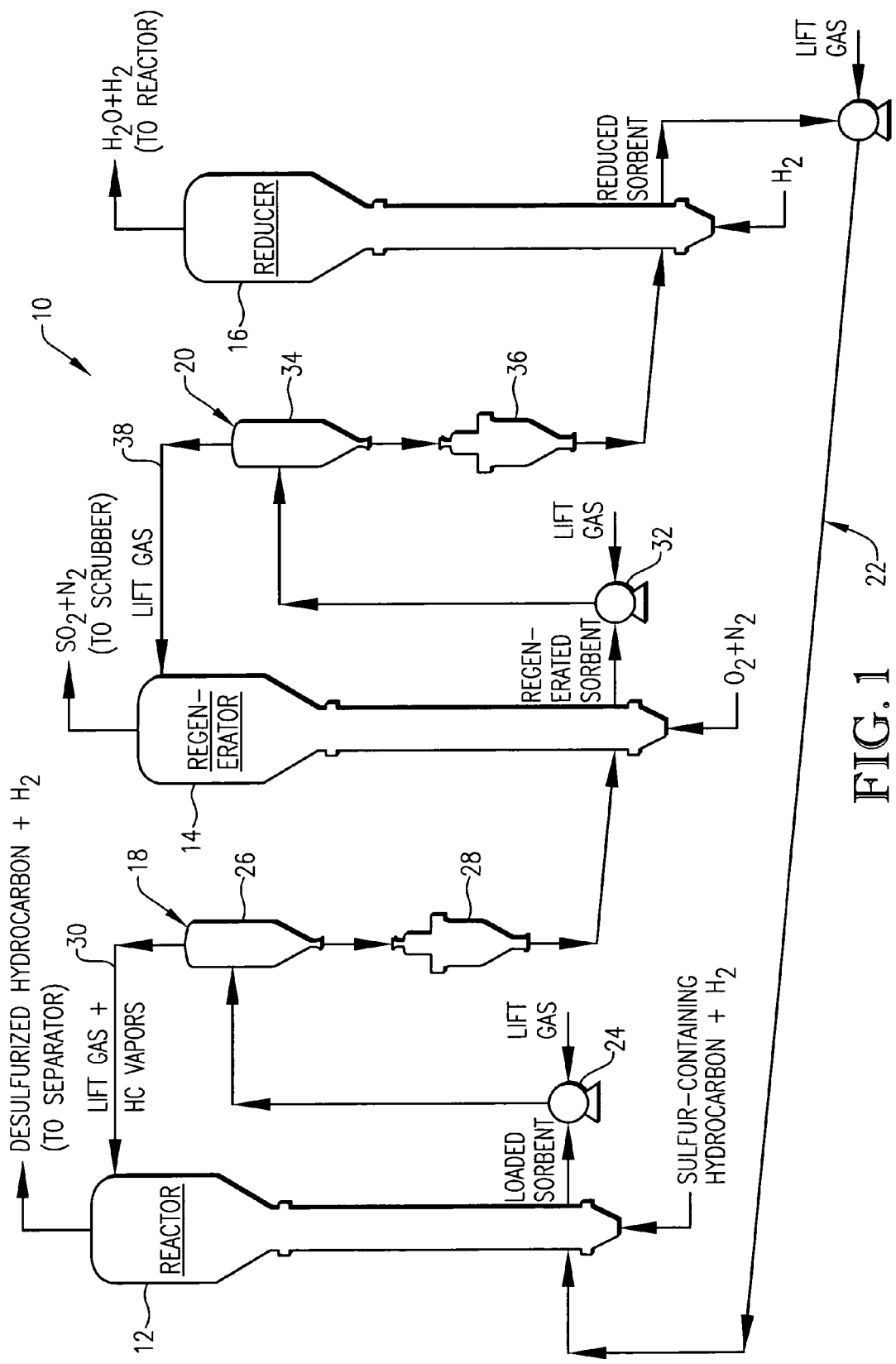
FIG. 1 is a schematic diagram of a desulfurization unit constructed in accordance with the principals of the present invention, particularly illustrating the circulation of regenerable solid sorbent particulates through the reactor, regenerator, and reducer.

Referring initially to FIG. 1, a desulfurization unit 10 is illustrated as generally comprising a fluidized bed reactor 12, a fluidized bed regenerator 14, and a fluidized bed reducer 16. Solid sorbent particulates are circulated in desulfurization unit 10 to provide for continuous sulfur removal from a sulfur-containing hydrocarbon, such as cracked-gasoline or diesel fuel. The solid sorbent particulates employed in desulfurization unit 10 can be any sufficiently fluidizable, circulatable, and regenerable zinc oxide-based composition having sufficient desulfurization activity and sufficient attrition resistance. A description of such a sorbent composition is provided in U.S. Pat. Nos. 6,429,170 and 6,864,215, the entire disclosures of which are incorporated herein by reference.

In fluidized bed reactor 12, a hydrocarbon-containing fluid stream is passed upwardly through a bed of reduced solid sorbent particulates. The reduced solid sorbent particulates contacted with the hydrocarbon-containing stream in reactor 12 preferably initially (i.e., immediately prior to contacting with the hydrocarbon-containing fluid stream) comprise zinc oxide and a reduced-valence promoter metal component. Though not wishing to be bound by theory, it is believed that the reduced-valence promoter metal component of the reduced solid sorbent particulates facilitates the removal of sulfur from the hydrocarbon-containing stream, while the zinc oxide operates as a sulfur storage mechanism via its conversion to zinc sulfide.

The reduced-valence promoter metal component of the reduced solid sorbent particulates preferably comprises a promoter metal selected from a group consisting of nickel, cobalt, iron, manganese, tungsten, silver, gold, copper, platinum, zinc, tin, ruthenium, molybdenum, antimony, vanadium, iridium, chromium, palladium. More preferably, the reduced-valence promoter metal component comprises nickel as the promoter metal. As used herein, the term "reduced-valence" when describing the promoter metal component, shall denote a promoter metal component having a valence which is less than the valence of the promoter metal component in its common oxidized state. More specifically, the reduced solid sorbent particulates employed in reactor 12 should include a promoter metal component having a valence which is less than the valence of the promoter metal component of the regenerated (i.e., oxidized) solid sorbent particulates exiting regenerator 14. Most preferably, substantially all of the promoter metal component of the reduced solid sorbent particulates has a valence of 0.

In a preferred embodiment of the present invention the reduced-valence promoter metal component comprises, consists of, or consists essentially of, a substitutional solid metal solution characterized by the formula: $M_A Zn_B$, wherein M is the promoter metal and A and B are each numerical values in the range of from 0.01 to 0.99. In the above formula for the substitutional solid metal solution, it is preferred for A to be in the range of from about 0.70 to about 0.97, and most preferably in the range of from about 0.85 to about 0.95. It is further preferred for B to be in the range of from about 0.03 to about 0.30, and most preferably in the range of from about 0.05 to 0.15. Preferably, B is equal to (1-A).

Substitutional solid solutions have unique physical and chemical properties that are important to the chemistry of the sorbent composition described herein. Substitutional solid solutions are a subset of alloys that are formed by the direct substitution of the solute metal for the solvent metal atoms in the crystal structure. For example, it is believed that the substitutional solid metal solution ($M_A Zn_B$) found in the reduced solid sorbent particulates is formed by the solute zinc metal atoms substituting for the solvent promoter metal atoms. There are three basic criteria that favor the formation of substitutional solid solutions: (1) the atomic radii of the two elements are within 15 percent of each other; (2) the crystal structures of the two pure phases are the same; and (3) the electronegativities of the two components are similar. The promoter metal (as the elemental metal or metal oxide) and zinc oxide employed in the solid sorbent particulates described herein preferably meet at least two of the three criteria set forth above. For example, when the promoter metal is nickel, the first and third criteria, are met, but the second is not. The nickel and zinc metal atomic radii are within 10 percent of each other and the electronegativities are similar. However, nickel oxide (NiO) preferentially forms a cubic crystal structure, while zinc oxide (ZnO) prefers a hexagonal crystal structure. A nickel zinc solid solution retains the cubic structure of the nickel oxide. Forcing the zinc oxide to reside in the cubic structure increases the energy of the phase, which limits the amount of zinc that can be dissolved in the nickel oxide structure. This stoichiometry control manifests itself microscopically in a 92:8 nickel zinc solid solution ($Ni_{0.92}Zn_{0.08}$) that is formed during reduction and microscopically in the repeated regenerability of the solid sorbent particulates.

In addition to zinc oxide and the reduced-valence promoter metal component, the reduced solid sorbent particulates employed in reactor 12 may further comprise a porosity enhancer and a promoter metal-zinc aluminate substitutional solid solution. The promoter metal-zinc aluminate substitutional solid solution can be characterized by the formula: $M_ZZn_{(1-Z)}Al_2O_4$, wherein Z is a numerical value in the range of from 0.01 to 0.99. The porosity enhancer, when employed, can be any compound which ultimately increases the macroporosity of the solid sorbent particulates. Preferably, the porosity enhancer is perlite. The term "perlite" as used herein is the petrographic term for a siliceous volcanic rock which naturally occurs in certain regions throughout the world. The distinguishing feature, which sets it apart from other volcanic minerals, is its ability to expand 4 to 20 times its original volume when heated to certain temperatures. When heated above 1600° F., crushed perlite expands due to the presence of combined water with the crude perlite rock. The combined water vaporizes during the heating process and creates countless tiny bubbles in the heat softened glassy particles. It is these diminutive glass sealed bubbles which account for its light weight. Expanded perlite can be manufactured to weigh as little as 2.5 lbs per cubic foot. Typical chemical analysis properties of expanded perlite are: silicon dioxide 73%, aluminum oxide 17%, potassium oxide 5%, sodium oxide 3%, calcium oxide 1%, plus trace elements. Typical physical properties of expanded perlite are: softening point 1600-2000° F., fusion point 2300° F.-2450° F., pH 6.6-6.8, and specific gravity 2.2-2.4. The term "expanded perlite" as used herein refers to the spherical form of perlite which has been expanded by heating the perlite siliceous volcanic rock to a temperature above 1600° F. The term "particulate expanded perlite" or "milled perlite" as used herein denotes that form of expanded perlite which has been subjected to crushing so as to form a particulate mass wherein the particle size of such mass is comprised of at least 97% of particles having a size of less than 2 microns. The term "milled expanded perlite" is intended to mean the product resulting from subjecting expanded perlite particles to milling or crushing.

The reduced solid sorbent particulates initially contacted with the hydrocarbon-containing fluid stream in reactor 12 can comprise zinc oxide, the reduced-valence promoter metal component ($M_AZn_B$), the porosity enhancer (PE), and the promoter metal-zinc aluminate ($M_ZZn_{(1-Z)Al2}O_4$) in the ranges provided below in Table 1.

TABLE 1

Components of the Reduced Solid Sorbent Particulates

| Range | ZnO (wt %) | $M_AZn_B$ (wt %) | PE (wt %) | $M_ZZn_{(1-Z)}Al_2O_4$ (wt %) |
|---|---|---|---|---|
| Preferred | 5-80 | 5-80 | 2-50 | 1-50 |
| More Preferred | 20-60 | 20-60 | 5-30 | 5-30 |
| Most Preferred | 30-50 | 30-40 | 10-20 | 10-20 |

The physical properties of the solid sorbent particulates which significantly affect the particulates suitability for use in desulfurization unit 10 include, for example, particle shape, particle size, particle density, and resistance to attrition. The solid sorbent particulates employed in desulfurization unit 10 preferably comprise microspherical particles having a mean particle size in the range of from about 20 to about 150 microns, more preferably in the range of from about 50 to about 100 microns, and most preferably in the range of from 60 to 80 microns. The density of the solid sorbent particulates is preferably in the range of from about 0.5 to about 1.5 grams per cubic centimeter (g/cc), more preferably in the range of from about 0.8 to about 0.3 g/cc, and most preferably in the range of from 0.9 to 1.2 g/cc. The particle size and density of the solid sorbent particulates preferably qualify the solid sorbent particulates as a Group A solid under the Geldart group classification system described in *Powder Technol.*, 7, 285-292 (1973). The sorbent and catalyst particles of the solid particulate system preferably have high resistance to attrition. As used herein, the term "attrition resistance" denotes a measure of a particle's resistance to size reduction under controlled conditions of turbulent motion. The attrition resistance of a particle can be quantified using the jet cup attrition test, similar to the Davidson Index. The Jet Cup Attrition Index represents the weight percent of the over 44 micrometer particle size fraction which is reduced to particle sizes of less than 37 micrometers under test conditions and involves screening a 5 gram sample of solid particles to remove particles in the 0 to 44 micrometer size range. The particles above 44 micrometers are then subjected to a tangential jet of air at a rate of 21 liters per minute introduced through a 0.0625 inch orifice fixed at the bottom of a specially designed jet cup (1" I.D.×2" height) for a period of 1 hour. The Jet Cup Attrition Index (JCAI) is calculated as follows:

$$JCAI = \frac{\text{Wt. of } 0-37 \text{ Micrometer Formed During Test}}{\text{Wt. of Original} + 44 \text{ Micrometer Fraction Being Tested}} \times 100 \times CF$$

The Correction Factor (CF) (presently 0.30) is determined by using a known calibration standard to adjust for differences in jet cup dimensions and wear. The sorbent and catalyst particles employed in the present invention preferably have a Jet Cup Attrition Index value of less than about 30, more preferably less than about 20, and most preferably less than 15.

The hydrocarbon-containing fluid stream contacted with the reduced solid sorbent particulates in reactor 12 preferably comprises a sulfur-containing hydrocarbon and hydrogen. The molar ratio of the hydrogen to the sulfur-containing hydrocarbon charged to reactor 12 is preferably in the range of from about 0.1:1 to about 3:1, more preferably in the range of from about 0.2:1 to about 1:1, and most preferably in the range of from 0.25:1 to 0.8:1. Preferably, the sulfur-containing hydrocarbon is a fluid which is normally in a liquid state at standard temperature and pressure, but which exists in a gaseous state when combined with hydrogen, as described above, and exposed to the desulfurization conditions in reactor 12. The sulfur-containing hydrocarbon preferably can be used as a fuel or a precursor to fuel. Examples of suitable sulfur-containing hydrocarbons include cracked-gasoline, diesel fuels, jet fuels, straight-run naphtha, straight-run distillates, coker gas oil, coker naphtha, alkylates, and straight-run gas oil. Most preferably, the sulfur-containing hydrocarbon comprises a hydrocarbon fluid selected from the group consisting of gasoline, cracked-gasoline, diesel fuel, and mixtures thereof.

As used herein, the term "gasoline" denotes a mixture of hydrocarbons boiling in a range of from about 100° F. to about 400° F., or any fraction thereof. Examples of suitable gasolines include, but are not limited to, hydrocarbon streams in refineries such as naphtha, straight-run naphtha, coker naphtha, catalytic gasoline, visbreaker naphtha, alkylates, isomerate, reformate, and the like, and mixtures thereof.

As used herein, the term "cracked-gasoline" denotes a mixture of hydrocarbons boiling in a range of from about 100° F. to about 400° F., or any fraction thereof, that are products of either thermal or catalytic processes that crack larger hydrocarbon molecules into smaller molecules. Examples of suitable thermal processes include, but are not limited to, coking, thermal cracking, visbreaking, and the like, and combinations thereof. Examples of suitable catalytic cracking processes include, but are not limited to, fluid catalytic cracking, heavy oil cracking, and the like, and combinations thereof. Thus, examples of suitable cracked-gasolines include, but are not limited to, coker gasoline, thermally cracked gasoline, visbreaker gasoline, fluid catalytically cracked gasoline, heavy oil cracked-gasoline and the like, and combinations thereof. In some instances, the cracked-gasoline may be fractionated and/or hydrotreated prior to desulfurization when used as the sulfur-containing fluid in the process in the present invention.

As used herein, the term "diesel fuel" denotes a mixture of hydrocarbons boiling in a range of from about 300° F. to about 750° F., or any fraction thereof. Examples of suitable diesel fuels include, but are not limited to, light cycle oil, kerosene, jet fuel, straight-run diesel, hydrotreated diesel, and the like, and combinations thereof.

The sulfur-containing hydrocarbon described herein as suitable feed in the inventive desulfurization process comprises a quantity of olefins, aromatics, and sulfur, as well as paraffins and naphthenes. The amount of olefins in gaseous cracked-gasoline is generally in a range of from about 10 to about 35 weight percent olefins based on the total weight of the gaseous cracked-gasoline. For diesel fuel there is essentially no olefin content. The amount of aromatics in gaseous cracked-gasoline is generally in a range of from about 20 to about 40 weight percent aromatics based on the total weight of the gaseous cracked-gasoline. The amount of aromatics in gaseous diesel fuel is generally in a range of from about 10 to about 90 weight percent aromatics based on the total weight of the gaseous diesel fuel. The amount of atomic sulfur in the sulfur-containing hydrocarbon fluid, preferably cracked-gasoline or diesel fuel, suitable for use in the inventive desulfurization process is generally greater than about 50 parts per million by weight (ppmw) of the sulfur-containing hydrocarbon fluid, more preferably in a range of from about 100 ppmw atomic sulfur to about 10,000 ppmw atomic sulfur, and most preferably from 150 ppmw atomic sulfur to 500 ppmw atomic sulfur. It is preferred for at least about 50 weight percent of the atomic sulfur present in the sulfur-containing hydrocarbon fluid employed in the present invention to be in the form of organosulfur compounds. More preferably, at least about 75 weight percent of the atomic sulfur present in the sulfur-containing hydrocarbon fluid is in the form of organosulfur compounds, and most preferably at least 90 weight percent of the atomic sulfur is in the form of organosulfur compounds. As used herein, "sulfur" used in conjunction with "ppmw sulfur" or the term "atomic sulfur", denotes the amount of atomic sulfur (about 32 atomic mass units) in the sulfur-containing hydrocarbon, not the atomic mass, or weight, of a sulfur compound, such as an organosulfur compound.

As used herein, the term "sulfur" denotes sulfur in any form normally present in a sulfur-containing hydrocarbon such as cracked-gasoline or diesel fuel. Examples of such sulfur which can be removed from a sulfur-containing hydrocarbon fluid through the practice of the present invention include, but are not limited to, hydrogen sulfide, carbonyl sulfide (COS), carbon disulfide ($CS_2$), mercaptans (RSH), organic sulfides (R—S—R), organic disulfides (R—S—S—R), thiophene, substitute thiophenes, organic trisulfides, organic tetrasulfides, benzothiophene, alkyl thiophenes, alkyl benzothiophenes, alkyl dibenzothiophenes, and the like, and combinations thereof, as well as heavier molecular weights of the same which are normally present in sulfur-containing hydrocarbons of the types contemplated for use in the desulfurization process of the present invention, wherein each R can by an alkyl, cycloalkyl, or aryl group containing 1 to 10 carbon atoms.

As used herein, the term "fluid" denotes gas, liquid, vapor, and combinations thereof.

As used herein, the term "gaseous" denotes the state in which the sulfur-containing hydrocarbon fluid, such as cracked-gasoline or diesel fuel, is primarily in a gas or vapor phase.

As used herein, the term "finely divided" denotes particles having a mean particle size less than 500 microns.

In fluidized bed reactor 12 the finely divided reduced solid sorbent particulates are contacted with the upwardly flowing gaseous hydrocarbon-containing fluid stream under a set of desulfurization conditions sufficient to produce a desulfurized hydrocarbon and sulfur-loaded solid sorbent particulates. The flow of the hydrocarbon-containing fluid stream is sufficient to fluidize the bed of solid sorbent particulates located in reactor 12. The desulfurization conditions in reactor 12 include temperature, pressure, weighted hourly space velocity (WHSV), and superficial velocity. The preferred ranges for such desulfurization conditions are provided below in Table 2.

TABLE 2

| | Desulfurization Conditions | | | |
| --- | --- | --- | --- | --- |
| Range | Temp (° F.) | Press. (psig) | WHSV ($hr^{-1}$) | Superficial Vel. (ft/s) |
| Preferred | 250-1200 | 25-750 | 1-20 | 0.25-5 |
| More Preferred | 500-1000 | 100-400 | 2-12 | 0.5-2.5 |
| Most Preferred | 700-850 | 150-250 | 3-8 | 1.0-1.5 |

When the reduced solid sorbent particulates are contacted with the hydrocarbon-containing stream in reactor 12 under desulfurization conditions, sulfur compounds, particularly organosulfur compounds, present in the hydrocarbon-containing fluid stream are removed from such fluid stream. At least a portion of the sulfur removed from the hydrocarbon-containing fluid stream is employed to convert at least a portion of the zinc oxide of the reduced solid sorbent particulates into zinc sulfide.

In contrast to many conventional sulfur removal processes (e.g., hydrodesulfurization), it is preferred that substantially none of the sulfur in the sulfur-containing hydrocarbon fluid is converted to, and remains as, hydrogen sulfide during desulfurization in reactor 12. Rather, it is preferred that the fluid effluent from reactor 12 (generally comprising the desulfurized hydrocarbon and hydrogen) comprises less than the amount of hydrogen sulfide, if any, in the fluid feed charged to reactor 12 (generally comprising the sulfur-containing hydrocarbon and hydrogen). The fluid effluent from reactor 12 preferably contains less than about 50 weight percent of the amount of sulfur in the fluid feed charged to reactor 12, more preferably less than about 20 weight percent of the amount of sulfur in the fluid feed, and most preferably less than 5 weight percent of the amount of sulfur in the fluid feed. It is preferred for the total sulfur content of the fluid effluent from reactor 12 to be less than about 50 parts per million by weight (ppmw) of the total fluid effluent, more preferably less than about 30 ppmw, still more preferably less than about 15 ppmw, and most preferably less than 10 ppmw.

After desulfurization in reactor 12, the desulfurized hydrocarbon fluid, preferably desulfurized cracked-gasoline or desulfurized diesel fuel, can thereafter be separated and recovered from the fluid effluent and preferably liquified. The liquification of such desulfurized hydrocarbon fluid can be accomplished by any method or manner known in the art. The resulting liquified, desulfurized hydrocarbon preferably comprises less than about 50 weight percent of the amount of sulfur in the sulfur-containing hydrocarbon (e.g., cracked-gasoline or diesel fuel) charged to the reaction zone, more preferably less than about 20 weight percent of the amount of sulfur in the sulfur-containing hydrocarbon, and most preferably less than 5 weight percent of the amount of sulfur in the sulfur-containing hydrocarbon. The desulfurized hydrocarbon preferably comprises less than about 50 ppmw sulfur, more preferably less than about 30 ppmw sulfur, still more preferably less than about 15 ppmw sulfur, and most preferably less than 10 ppmw sulfur.

After desulfurization in reactor 12, at least a portion of the sulfur-loaded sorbent particulates are transported to regenerator 14 via a first transport assembly 18. In regenerator 14, the sulfur-loaded solid sorbent particulates are contacted with an oxygen-containing regeneration stream. The oxygen-containing regeneration stream preferably comprises at least 1 mole percent oxygen with the remainder being a gaseous diluent. More preferably, the oxygen-containing regeneration stream comprises in the range of from about 1 to about 50 mole percent oxygen and in the range of from about 50 to about 95 mole percent nitrogen, still more preferable in the range of from about 2 to about 20 mole percent oxygen and in the range of from about 70 to about 90 mole percent nitrogen, and most preferably in the range of from 3 to 10 mole percent oxygen and in the range of from 75 to 85 mole percent nitrogen.

The regeneration conditions in regenerator 14 are sufficient to convert at least a portion of the zinc sulfide of the sulfur-loaded solid sorbent particulates into zinc oxide via contacting with the oxygen-containing regeneration stream. The preferred ranges for such regeneration conditions are provided below in Table 3.

TABLE 3

| | Regeneration Conditions | | |
|---|---|---|---|
| Range | Temp (° F.) | Press. (psig) | Superficial Vel. (ft/s) |
| Preferred | 500-1500 | 10-250 | 0.5-10 |
| More Preferred | 700-1200 | 20-150 | 1.0-5.0 |
| Most Preferred | 900-1100 | 10-75 | 2.0-2.5 |

When the sulfur-loaded solid sorbent particulates are contacted with the oxygen-containing regeneration stream under the regeneration conditions described above, at least a portion of the promoter metal component is oxidized to form an oxidized promoter metal component. Preferably, in regenerator 14 the substitutional solid metal solution ($M_A Zn_B$) and/or sulfided substitutional solid metal solution ($M_A Zn_B S$) of the sulfur-loaded sorbent is converted to a substitutional solid metal oxide solution characterized by the formula: $M_X Zn_Y O$, wherein M is the promoter metal and X and Y are each numerical values in the range of from 0.01 to about 0.99. In the above formula, it is preferred for X to be in the range of from about 0.5 to about 0.9 and most preferably from 0.6 to 0.8. It is further preferred for Y to be in the range of from about 0.1 to about 0.5, and most preferably from 0.2 to 0.4. Preferably, Y is equal to (1-X).

The regenerated solid sorbent particulates exiting regenerator 14 can comprise zinc oxide, the oxidized promoter metal component ($M_X Zn_Y O$), the porosity enhancer (PE), and the promoter metal-zinc aluminate ($M_Z Zn_{(1-Z)} Al_2 O_4$) in the ranges provided below in Table 4.

TABLE 4

| | Components of the Regenerated Solid Sorbent Particulates | | | |
|---|---|---|---|---|
| Range | ZnO (wt %) | $M_X Zn_Y O$ (wt %) | PE (wt %) | $M_Z Zn_{(1-Z)} Al_2 O_4$ (wt %) |
| Preferred | 5-80 | 5-70 | 2-50 | 1-50 |
| More Preferred | 20-60 | 15-60 | 5-30 | 5-30 |
| Most Preferred | 30-50 | 20-40 | 10-20 | 10-20 |

After regeneration in regenerator 14, the regenerated (i.e., oxidized) solid sorbent particulates are transported to reducer 16 via a second transport assembly 20. In reducer 16, the regenerated solid sorbent particulates are contacted with a hydrogen-containing reducing stream. The hydrogen-containing reducing stream preferably comprises at least 50 mole percent hydrogen with the remainder being cracked hydrocarbon products such as, for example, methane, ethane, and propane. More preferably, the hydrogen-containing reducing stream comprises about 70 mole percent hydrogen, and most preferably at least 80 mole percent hydrogen. The reducing conditions in reducer 16 are sufficient to reduce the valence of the oxidized promoter metal component of the regenerated solid sorbent particulates. The preferred ranges for such reducing conditions are provided below in Table 5.

TABLE 5

| | Reducing Conditions | | |
|---|---|---|---|
| Range | Temp (° F.) | Press. (psig) | Superficial Vel. (ft/s) |
| Preferred | 250-1250 | 25-750 | 0.1-4.0 |
| More Preferred | 600-1000 | 100-500 | 0.2-2.0 |
| Most Preferred | 750-850 | 200-400 | 0.3-1.0 |

When the regenerated solid sorbent particulates are contacted with the hydrogen-containing reducing stream in reducer 16 under the reducing conditions described above, at least a portion of the oxidized promoter metal component is reduced to form the reduced-valence promoter metal component. Preferably, at least a substantial portion of the substitutional solid metal oxide solution ($M_X Zn_Y O$) is converted to the reduced-valence promoter metal component ($M_A Zn_B$).

After the solid sorbent particulates have been reduced in reducer 16, they can be transported back to reactor 12 via a third transport assembly 22 for recontacting with the hydrocarbon-containing fluid stream in reactor 12.

Referring again to FIG. 1, first transport assembly 18 generally comprises a reactor pneumatic lift 24, a reactor receiver 26, and a reactor lockhopper 28 fluidly disposed between reactor 12 and regenerator 14. During operation of desulfurization unit 10 the sulfur-loaded sorbent particulates are continuously withdrawn from reactor 12 and lifted by reactor pneumatic lift 24 from reactor 12 to reactor receiver 18. Reactor receiver 18 is fluidly coupled to reactor 12 via a reactor return line 30. The lift gas used to transport the sulfur-loaded sorbent particulates from reactor 12 to reactor receiver 26 is separated from the sulfur-loaded sorbent particulates in reactor receiver 26 and returned to reactor 12 via reactor return line 30. Reactor lockhopper 26 is operable to transition the sulfur-loaded sorbent particulates from the high pressure hydrocarbon environment of reactor 12 and reactor receiver 26 to the low pressure oxygen environment of regenerator 14. To accomplish this transition, reactor lockhopper 28 periodically receives batches of the sulfur-loaded sorbent particulates from reactor receiver 26, isolates the sulfur-loaded sorbent particulates from reactor receiver 26 and regenerator 14, and changes the pressure and composition of the environment surrounding the sulfur-loaded sorbent particulates from a high pressure hydrocarbon environment to a low pressure inert (e.g., nitrogen) environment. After the environment of the sulfur-loaded sorbent particulates has been transitioned, as described above, the sulfur-loaded sorbent particulates are batch-wise transported from reactor lockhopper 28 to regenerator 14. Because the sulfur-loaded solid particulates are continuously withdrawn from reactor 12 but processed in a batch mode in reactor lockhopper 28, reactor receiver 26 functions as a surge vessel wherein the sulfur-loaded sorbent particulates continuously withdrawn from reactor 12 can be accumulated between transfers of the sulfur-loaded sorbent particulates from reactor receiver 26 to reactor lockhopper 28. Thus, reactor receiver 26 and reactor lockhopper 28 cooperate to transition the flow of the sulfur-loaded sorbent particulates between reactor 12 and regenerator 14 from a continuous mode to a batch mode.

Second transport assembly 20 generally comprises a regenerator pneumatic lift 32, a regenerator receiver 34, and a regenerator lockhopper 36 fluidly disposed between regenerator 14 and reducer 16. During operation of desulfurization unit 10 the regenerated sorbent particulates are continuously withdrawn from regenerator 14 and lifted by regenerator pneumatic lift 32 from regenerator 14 to regenerator receiver 34. Regenerator receiver 34 is fluidly coupled to regenerator 14 via a regenerator return line 38. The lift gas used to transport the regenerated sorbent particulates from regenerator 14 to regenerator receiver 34 is separated from the regenerated sorbent particulates in regenerator receiver 34 and returned to regenerator 14 via regenerator return line 38. Regenerator lockhopper 36 is operable to transition the regenerated sorbent particulates from the low pressure oxygen environment of regenerator 14 and regenerator receiver 34 to the high pressure hydrogen environment of reducer 16. To accomplish this transition, regenerator lockhopper 36 periodically receives batches of the regenerated sorbent particulates from regenerator receiver 34, isolates the regenerated sorbent particulates from regenerator receiver 34 and reducer 16, and changes the pressure and composition of the environment surrounding the regenerated sorbent particulates from a low pressure oxygen environment to a high pressure hydrogen environment. After the environment of the regenerated sorbent particulates has been transitioned, as described above, the regenerated sorbent particulates are batch-wise transported from regenerator lockhopper 36 to reducer 16. Because the regenerated sorbent particulates are continuously withdrawn from regenerator 14 but processed in a batch mode in regenerator lockhopper 36, regenerator receiver 34 functions as a surge vessel wherein the sorbent particulates continuously withdrawn from regenerator 14 can be accumulated between transfers of the regenerated sorbent particulates from regenerator receiver 34 to regenerator lockhopper 36. Thus, regenerator receiver 34 and regenerator lockhopper 36 cooperate to transition the flow of the regenerated sorbent particulates between regenerator 14 and reducer 16 from a continuous mode to a batch mode.

Figure 2:
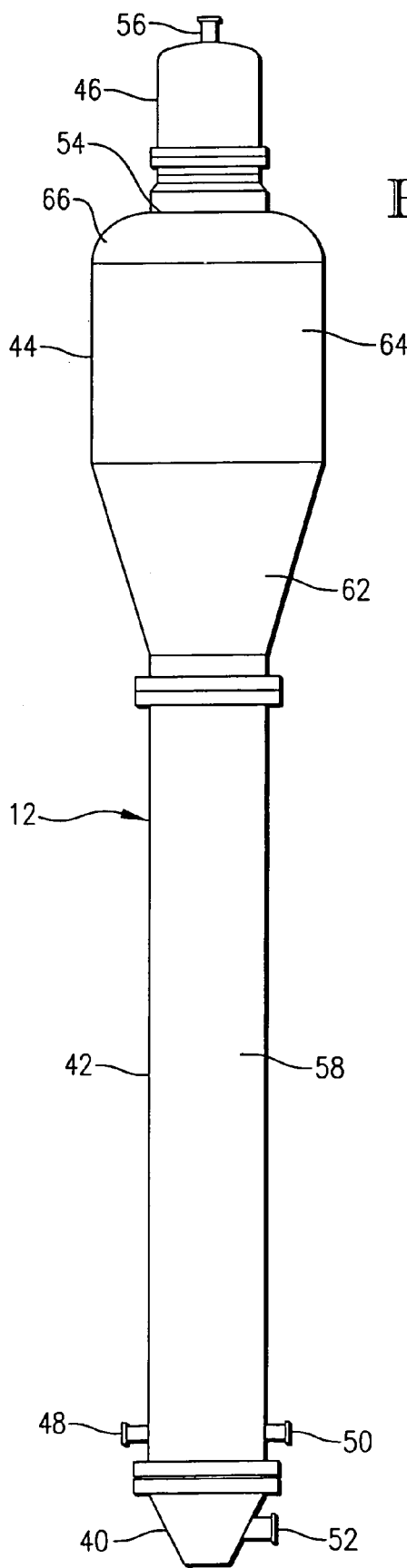
FIG. 2 is a side view of a fluidized bed reactor constructed in accordance with the principals of the present invention.

Referring now to FIG. 2, reactor 12 is illustrated as generally comprising a plenum 40, a reactor section 42, a disengagement section 44, and a solids filter 46. The reduced solid sorbent particulates are provided to reactor 12 via a solids inlet 48 in reactor section 42. The sulfur-loaded solid sorbent particulates are withdrawn from reactor 12 via a solids outlet 50 in reactor section 42. The hydrocarbon-containing fluid stream is charged to reactor 12 via a fluid inlet 52 in plenum 40. Once in reactor 12, the hydrocarbon-containing fluid stream flows upwardly through reactor section 42 and disengagement section 44 and exits a fluid outlet 54 in the upper portion of disengagement section 44. Filter 46 is received in fluid outlet 54 and extends at least partially into the interior of disengagement section 44. Filter 46 is operable to allow fluids to pass through fluid outlet 54 while substantially blocking the flow of any solid sorbent particulates through fluid outlet 54. The fluid (typically a desulfurized hydrocarbon and hydrogen) that flows through fluid outlet 54 exits filter 46 via a filter outlet 56.

Figures 3, 4:
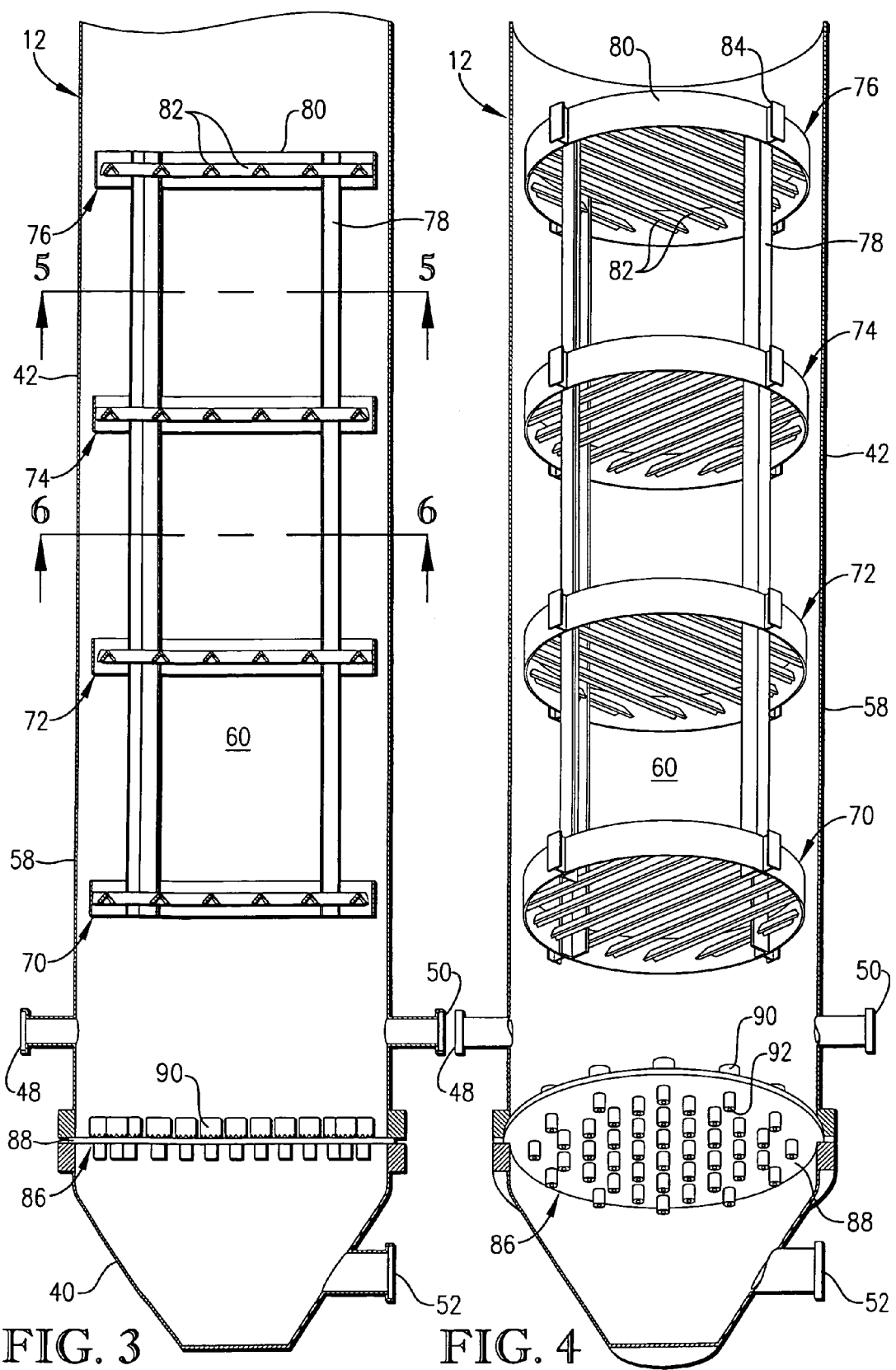
FIG. 3 is a partial sectional side view of the fluidized bed reactor, particularly illustrating the series of vertically spaced contact-enhancing baffle groups disposed in the reaction zone.
FIG. 4 is a partial isometric view of the fluidized bed reactor with certain portions of the reactor vessel being cut away to more clearly illustrate the orientation and shape of the contacting-enhancing baffle groups in the reaction zone.

Referring to FIGS. 2 and 3, reactor section 42 includes a substantially cylindrical reactor section wall 58 which defines an elongated, upright, substantially cylindrical reaction zone 60 within reactor section 42. Reaction zone 60 preferably has a height in the range of from about 15 to about 150 feet, more preferably in the range of from about 30 to about 80 feet, and most preferably in the range of from 40 to 70 feet. Reaction zone 60 preferably has a width (i.e., diameter) in the range of from about 1 to about 10 feet, more preferably in the range of from about 3 to about 8 feet, and most preferably in the range of from 4 to 5 feet. The ratio of the height of reaction zone 60 to the width (i.e., diameter) of reaction zone 60 is preferably in the range of from about 2:1 to about 15:1, more preferably in the range of from about 3:1 to about 10:1, and most preferably in the range of from about 4:1 to about 8:1. In reaction zone 60, the upwardly flowing fluid is passed through solid particulates to thereby create a fluidized bed of solid particulates. It is preferred for the resulting fluidized bed of solid particulates to be substantially contained within reaction zone 60. The ratio of the height of the fluidized bed to the width of the fluidized bed is preferably in the range of from about 1:1 to about 10:1, more preferably in the range of from about 2:1 to about 7:1, and most preferably in the range of from 2.5:1 to 5:1. The density of the fluidized bed is preferably in the range of from about 20 to about 60 $lb/ft^3$, more preferably in the range of from about 30 to about 50 $lb/ft^3$, and most preferably in the range of from about 35 to 45 $lb/ft^3$.

Referring again to FIG. 2, disengagement section 44 generally includes a generally frustoconical lower wall 62, a generally cylindrical mid-wall 64, and an upper cap 66. Disengagement section 44 defines a disengagement zone within reactor 12. It is preferred for the cross-sectional area of disengagement section 44 to be substantially greater than the cross-sectional area of reactor section 42 so that the velocity of the fluid flowing upwardly through reactor 12 is substantially lower in disengagement section 44 than in reactor section 42, thereby allowing solid particulates entrained in the upwardly flowing fluid to "fall out" of the fluid in the disengagement zone due to gravitational force. It is preferred for the maximum cross-sectional area of the disengagement zone defined by disengagement section 44 to be in the range of from about 2 to about 10 times greater than the maximum cross-sectional area of reaction zone 60, more preferably in the range of from about 3 to about 6 times greater than the maximum cross-sectional area of reaction zone 60, and most preferably in the range of from 3.5 to 4.5 times greater than the maximum cross-sectional area in reaction zone 60.

Referring to FIGS. 3 and 4, reactor 12 includes a series of generally horizontal, vertically spaced contact-enhancing baffle groups 70, 72, 74, 76 disposed in reaction zone 60. Baffle groups 70-76 are operable to minimize axial dispersion in reaction zone 60 when a fluid is contacted with solid particulates therein. Although FIGS. 3 and 4 show a series of 4 baffle groups 70-76, the number of baffle groups in reaction zone 60 can vary depending on the height and width of reaction zone 60. Preferably, 2 to 15 vertically spaced baffle groups are employed in reaction zone 60, more preferably 6 to 13 baffle groups are employed in reaction zone 60. The vertical spacing between adjacent baffle groups is preferably in the range of from about 0.02 to about 0.5 times the height of reaction zone 60, more preferably in the range of from about 0.05 to about 0.2 times the height of reaction zone 60, and most preferably in the range of from 0.075 to about 0.15 times the height of reaction zone 60. Preferably, the vertical spacing between adjacent baffle groups is in the range of from about 0.5 to about 8.0 feet, more preferably in the range of from about 1.0 to about 6.0 feet, and most preferably in the range of from 2 to 4 feet. The relative vertical spacing and horizontal orientation of baffle groups 70-76 is maintained by a plurality of vertical support members 78 which rigidly couple baffle groups 70-76 to one another.

Figure 5:
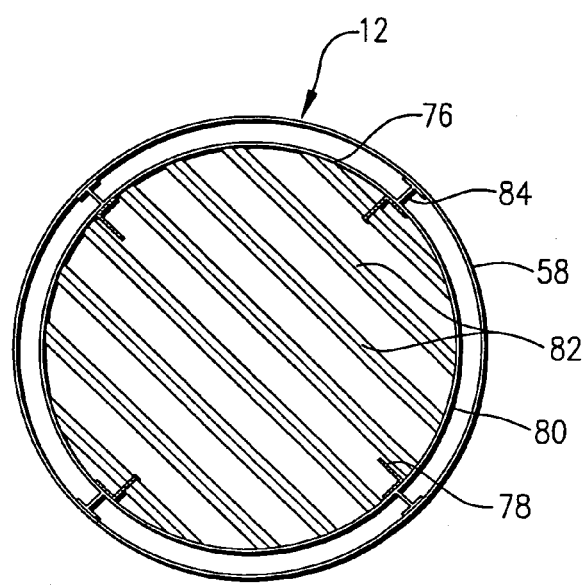
FIG. 5 is a sectional view of the fluidized bed reactor taken along line 5-5 in FIG. 3, particularly illustrating the construction of a single baffle group.

Referring now to FIG. 5, each baffle group 70-76 generally includes an outer ring 80 and a plurality of substantially parallelly extending, laterally spaced, elongated individual baffle members 82 coupled to and extending chordally within outer ring 80. Each individual baffle member 82 preferably presents a generally V-shaped cross-section, with the point of the "V" facing up. Preferably, each individual baffle member 82 is made of a single piece of angle iron. Thus, it is preferred for the each baffle member 82 to have a generally inverted V-shaped cross-section along the entire length of the baffle member 82. It is further preferred for each individual baffle member to have substantially no openings formed therein. Individual baffle members 82 are preferably laterally spaced from one another on about 1 to about 10 inch centers, more preferably on about 2 to about 6 inch centers. Each baffle group preferably has an open area between individual baffle members 82 which is about 40 to about 90 percent of the cross-sectional area of reaction zone 60 at the vertical location of that respective baffle group, more preferably the open area of each baffle group is about 55 to about 75 percent of the cross-sectional area of reaction zone 60 at the vertical location of that respective baffle group. Outer ring 80 preferably has an outer diameter which is about 75 to about 95 percent of the inner diameter of reactor section wall 58. A plurality of attachment members 84 are preferably rigidly coupled to the outer surface of outer ring 80 and are adapted to be coupled to the inner surface of reactor wall section 58, thereby securing baffle groups 70-76 to reactor section wall 58.

Figure 6:
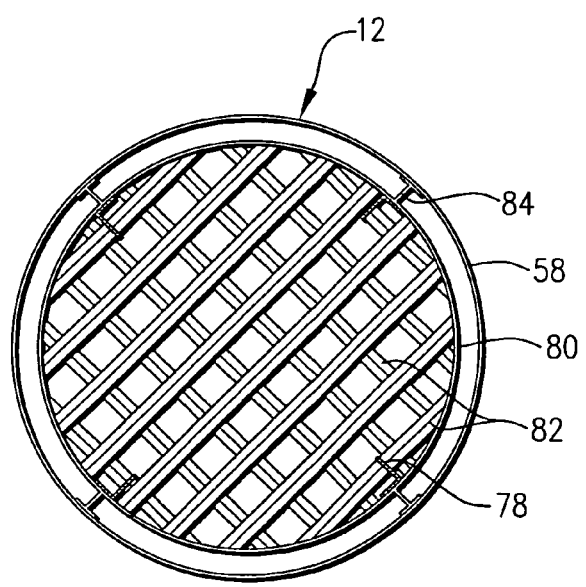
FIG. 6 is a sectional view of the fluidized bed reactor taken along line 6-6 in FIG. 3, particularly illustrating the cross-hatched pattern created by the individual baffle members of adjacent baffle groups, as well as the shape of the individual baffle members.

Referring now to FIGS. 4 and 6, it is preferred for individual baffle members 82 of adjacent ones of baffle groups 70-76 to form a "cross-hatched" pattern when viewed from an axial cross section of reactor section 42 (e.g., FIG. 6). Preferably, individual baffle members 82 of adjacent ones of baffle groups 70-76 extend transverse to one another at a cross-hatch angle in the range of from about 60 to about 120 degrees, more preferably in the range of from about 80 to about 100 degrees, still more preferably in the range of from about 85 to about 95 degrees, and most preferably substantially 90 degrees (i.e., substantially perpendicular). As used herein, the term "cross-hatch angle" shall denote the angle between the directions of extension of individual baffle members 82 of adjacent vertically spaced baffle groups 70-76, measured perpendicular to the longitudinal axis of the reaction zone 60.

Referring now to FIGS. 3 and 4, a distribution grid 86 is rigidly coupled to reactor 12 at the junction of plenum 40 and reactor section 42. Distribution grid 86 defines the bottom of reaction zone 60. Distribution grid 86 generally comprises a substantially disc-shaped distribution plate 88 and a plurality of bubble caps 90. Each bubble cap 90 defines a fluid opening 92 therein, through which the fluid entering plenum 40 through fluid inlet 52 may pass upwardly into reaction zone 60. Distribution grid 86 preferably includes in the range of from about 15 to about 90 bubble caps 90, more preferably in the range of from about 30 to about 60 bubble caps 90. Bubble caps 90 are operable to prevent a substantial amount of solid particulates from passing downwardly through distribution grid 86 when the flow of fluid upwardly through distribution grid 86 is terminated.

EXAMPLE

Materials and Methods

This example provides data as to the efficacy of the invention claimed herein as compared to the prior art. In order to test the hydrodynamic performance of a full-scale desulfurization reactor, a full-scale one-half round test reactor 100, shown in FIG. 7, was constructed. The test reactor 100 was constructed of steel, except for a flat Plexiglass face plate which provided visibility. The test reactor 100 comprised a plenum 102 which was 44 inches in height and expanded from 24 to 54 inches in diameter, a reactor section 104 which was 35 feet in height and 54 inches in diameter, an expanded section 106 which was 8 feet in height and expanded from 54 to 108 inches in diameter, and a dilute phase section 108 which was 4 feet in height and 108 inches in diameter. A distribution grid having 22 holes was positioned in reactor 100 proximate the junction of the plenum 102 and the reactor section 104. The test reactor 100 also included primary and secondary cyclones 110, 112 that returned catalyst to approximately one foot above the distribution grid. Fluidizing air was provided to plenum 102 from a compressor 114 via an air supply line 116. The flow rate of the air charged to reactor 100, in actual cubic feet per minute, was measured using a Pitot tube. Five superficial velocities were examined in this example, including the nominal values of 0.5, 0.75, 0.85, 1.0, and 1.25 ft/s. Catalyst was loaded in the reactor 100 from an external catalyst hopper, which was loaded from catalyst drums. A fluidized bed height of about 30 feet was achieved by adding or withdrawing catalyst.

Tracer tests were conducted in order to compare the degree of axial dispersion in the reactor 100 when different sets of horizontal baffle groups are employed. The types of baffle groups used are listed in Table 6.

TABLE 6

| Baffle Group | Type of Baffle | Vertical Spacing | Center-to-Center Spacing |
|---|---|---|---|
| 1 | Pipe | 4 feet | 6 inches |
| 2 | Pipe | 2 feet | 6 inches |
| 3 | Pipe | 4 feet | 4 inches |

TABLE 6-continued

| Baffle Group | Type of Baffle | Vertical Spacing | Center-to-Center Spacing |
|---|---|---|---|
| 4 | Pipe | 2 feet | 4 inches |
| 5 | V-shaped | 2 feet | 4.5 inches |

Each pipe baffle had diameter of 2.375 inches. With the vertical spacing described in Table 6, the 4-foot interval spacing led to a 7-baffle system while the 2-foot intervals led to a 13-baffle system. The distributor grid used a 22-hole bubble cap design. The catalyst blend used was a mixture of ⅔ fresh, spray dried catalyst from W. R. Grace and ⅓ FCC equilibrium catalyst. The catalyst blend used in this study had an average particle size of 71 microns, and a <40 micron content of 5.95 weight percent.

Tracer tests were conducted in order to compare the degree of axial dispersion in reactor 100 when sets of horizontal baffle members were employed in the reactor as described above. The testing of each baffle group was set up such that the first baffle row was placed at about 4 feet above the distributor, and each baffle row was oriented perpendicular to the adjacent row, thereby creating a generally cross-hatched baffle pattern (shown in FIG. 6).

Figure 7:
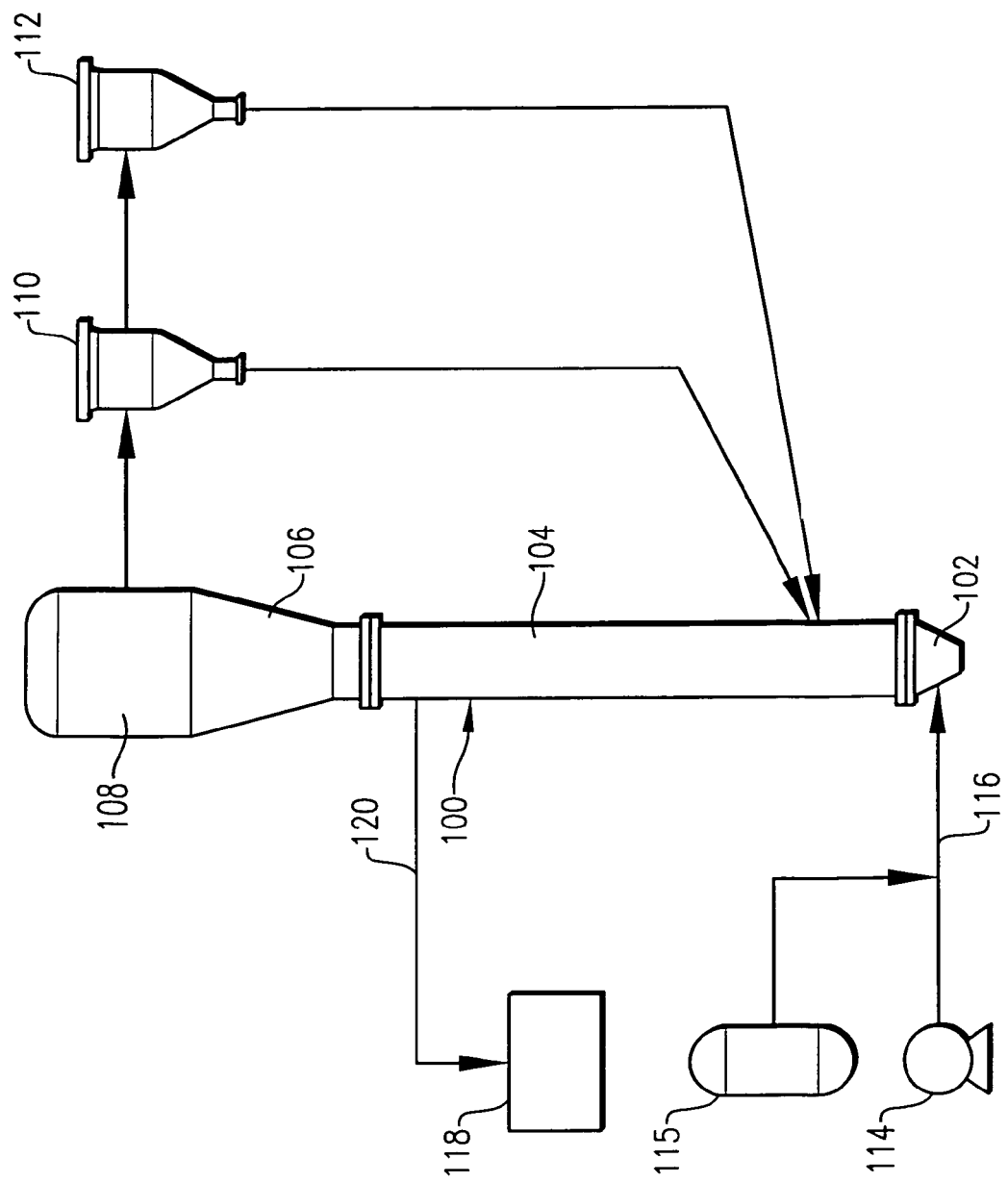
FIG. 7 is a schematic diagram of a full-scale fluidized bed test reactor system employed in tracer experiments for measuring fluidization characteristics in the reactor.

The tracer tests were conducted by injecting helium into reactor 100 as a non-absorbing tracer. For each experiment, the catalyst bed was fluidized with air. As shown in FIG. 7, helium from tank 115 was injected into the distributor gas in line 116, with a minimum of two injections per run. Each injection consisted of a 2 second pulse of helium. Samples were withdrawn from the top of the fluidized bed (i.e., ~30 ft.) via line 118. The withdrawn samples were analyzed in a Prolab Quadrapol mass spectrometer. Data was collected at approximately 1 second intervals to generate a residence time distribution curve of the helium.

Methods of Analysis

The fluidized bed performance was modeled in such a manner that the residence time distribution ("RTD") can be reduced to a Peclet number. The RTD curve of the injected helium is measured as the outlet concentration of helium as a function of time. Although the helium was sampled directly above the catalyst bed, there was some dead time in transferring the helium from the sampling point to the mass spectrometer that needed to be eliminated from the mean RTD analysis. The variance added from this step was small enough to be ignored. This dead time was eliminated by assuming that the zero for the RTD curve could be established by the appearance of the first non-zero value of helium.

In order to determine the Peclet number, a "closed system model was employed." In such a closed system, it was assumed that the helium gas moved in plug flow before and after the catalyst bed so that gas axial dispersion is due only to the catalyst. For a closed system, the Peclet number is related to variance and mean residence time in equation 1, below:

$$\frac{\sigma^2}{\bar{t}^2} = 2(1/Pe)^2[1 - \exp(-Pe)] \tag{1}$$

In this equation, $\sigma^2$ is the variance and $\bar{t}^2$ is the square of the mean residence time. Thus, calculation of the Peclet number depends on the calculation of these two parameters. One such method of calculating is the "Method of Moments." With this method, the mean residence time and variance are respectively the first and second moments of the residence time distribution and are calculated in accordance with equations 2 and 3, below.

$$\bar{t} = \frac{\sum_i t_i C_i \Delta t_i}{\sum_i C_i \Delta t_i} = \frac{\sum_i t_i C_i}{\sum_i C_i} \tag{2}$$

$$\sigma^2 = \frac{\sum_i t_i^2 C_i \Delta t_i}{\sum_i C_i \Delta t_i} - \bar{t}^2 = \frac{\sum_i t_i^2 C_i}{\sum_i C_i} - \bar{t}^2 \tag{3}$$

The existence of dead time in the experimental system between the pulse injection to the catalyst bed and between exiting the bed and the mass spectrometer complicates the calculation of mean residence time. Since the Peclet number is approximately proportional to the square of mean residence time, the dead time had to be accounted for in calculation in order to avoid predicting an erroneously high value for Peclet number. The following methods were used to ascertain the proper mean residence time. In order to properly apply equation 2, the initial time had to be correctly defined. The time of the pulse injection was not used because it would have created an artificially high Peclet number. Instead, dead time was eliminated by setting the initial time at which the tracer first appears in the detector. While this does result in an artificially low Peclet number, the variance between the experimental RTD's and the theoretical RTD's using low Peclet numbers was small.

The mean residence time for the helium was also determined from the superficial velocity, the actual gas flow, and the bed height of a cylindrical vessel, using equation 4.

$$\bar{t} = \frac{V}{Q} = \frac{L_f}{U_o} \tag{4}$$

The mean residence time determined from equation 4 is equal to that calculated from the tracer curve of equation 2. The actual volumetric flow rate of the fluidizing air was calculated from Pitot tube measurements.

Another method of analyzing the tracer RTD used was the "Peak Fit" method. This method used the tracer data in equation 5, below, and the residence time and standard deviation were extracted from the fitted curve.

$$h_{EMG}(t) = A \frac{\sigma_G}{\tau} \sqrt{2} \exp\left[1/2\left(\frac{\sigma_G}{\tau}\right)^2 - \frac{t-t_G}{\tau}\right] \int_{-\infty}^{z/\sqrt{2}} \exp(-x^2) dx \tag{5}$$

where $$z = (t-t_G)/\sigma_G - \sigma_G/\tau$$

Here, $t_G$ and $\sigma_G$ are the mean residence time and standard deviation, respectively. With these values, Equation 1 was used to determine the Peclet number.

Results and Discussion

To obtain the volumetric flow rate for the reactor, the Pitot tube measured flow rate was corrected for temperature and pressure at the catalyst bed surface. Measured values were obtained by taking the volumetric flow rates at the bed surface and dividing by the cross-sectional area of the 54-inch, ½ round catalyst bed. The results for each for each experiment are shown in Table 7, below.

TABLE 7

| Baffle Group | Superficial velocity, ft/s | FluidizedBed Height, ft | Bed Density, lb/ft³ | Bed Mass, lb |
|---|---|---|---|---|
| 1 | 0.53 | 26.5 | 48.8 | 10278 |
|   | 0.74 | 26.6 | 47.2 | 9999 |
|   | 0.92 | 26.9 | 45.7 | 9790 |
|   | 1.06 | 27.2 | 44.5 | 9625 |
|   | 1.28 | 27.3 | 43.6 | 9458 |
| 2 | 0.52 | 26.0 | 50.5 | 10440 |
|   | 0.80 | 26.1 | 48.3 | 10044 |
|   | 0.90 | 26.3 | 47.8 | 9986 |
|   | 1.03 | 26.5 | 46.8 | 9836 |
|   | 1.23 | 26.5 | 46.2 | 9747 |
| 3 | 0.50 | 26.3 | 50.4 | 10546 |
|   | 0.81 | 26.3 | 47.8 | 10004 |
|   | 0.91 | 26.5 | 47.0 | 9879 |
|   | 1.02 | 26.6 | 46.1 | 9750 |
|   | 1.25 | 26.9 | 44.5 | 9520 |
| 4 | 0.51 | 26.1 | 49.0 | 10172 |
|   | 0.78 | 26.3 | 46.9 | 9822 |
|   | 0.90 | 26.5 | 45.7 | 9637 |
|   | 1.04 | 26.7 | 44.6 | 9480 |
|   | 1.23 | 27.0 | 43.2 | 9274 |
| 5 | 0.53 | 25.9 | 49.2 | 10122 |
|   | 0.82 | 26.0 | 47.1 | 9747 |
|   | 0.94 | 26.1 | 46.4 | 9643 |
|   | 1.04 | 26.2 | 45.5 | 9477 |
|   | 1.25 | 26.4 | 43.8 | 9204 |

Additionally, pressure taps and a gauge at the top of reactor 100 were used to obtain a pressure profile across the catalyst bed. Because the fluidized bed height exceeded the highest placed pressure tap, bed heights were determined by extrapolating the pressure data to a zero pressure. These bed heights are shown in Table 7, above. Additionally, fluidized bed densities were determined from the slope of the pressure versus tap height data. These densities are also reported in Table 7 along with the mass of the bed determined from the density and the bed heights. The decrease in bed mass with increasing superficial velocity is the result of catalyst being withdrawn to maintain a constant bed height.

For each experimental condition of superficial velocity and baffle configuration, at least two helium injections were made. From these data, variance and mean residence times were calculated using the "Method of Moments" method of equations 2 and 3 or the "Peak Fit" approach of equation 5. Additionally, the mean residence time was also calculated using the actual gas flow method of equation 4. The mean residence times and variances for these three different approaches are reported in Table 8, below.

TABLE 8

| Baffle Group | Uo, nominal, ft/s | Uo at Bed Surface, ft/s | "Method of Moments" Residence Time, s | "Peak Fit" Time, s | Residence Time Based on Measured Gas Flow, s | "Method of Moments" Variance | "Peak Fit" Variance |
|---|---|---|---|---|---|---|---|
| 1 | 0.5 | 0.53 | 49.6 | 52.7 | 50.3 | 1091.3 | 1391.5 |
|   | 0.75 | 0.74 | 32.7 | 35.0 | 36.2 | 533.3 | 616.5 |
|   | 0.85 | 0.92 | 26.0 | 30.7 | 29.3 | 312.8 | 433.5 |
|   | 1.0 | 1.06 | 24.7 | 29.7 | 25.6 | 253.2 | 276.1 |
|   | 1.25 | 1.28 | 19.7 | 25.5 | 21.2 | 190.2 | 208.3 |
| 2 | 0.5 | 0.52 | 42.7 | 48.4 | 50.2 | 844.1 | 1341.5 |
|   | 0.75 | 0.80 | 31.5 | 31.7 | 32.6 | 497.8 | 603.3 |
|   | 0.85 | 0.90 | 27.2 | 30.6 | 29.1 | 350.5 | 469.8 |
|   | 1.0 | 1.03 | 24.2 | 26.7 | 25.8 | 325.5 | 372.8 |
|   | 1.25 | 1.23 | 22.6 | 24.7 | 21.5 | 234.0 | 291.2 |
| 3 | 0.5 | 0.50 | 39.9 | 39.9 | 52.6 | 572.6 | 759.1 |
|   | 0.75 | 0.81 | 29.2 | 29.7 | 32.4 | 305.1 | 437.3 |
|   | 0.85 | 0.91 | 24.5 | 25.0 | 29.2 | 209.3 | 265.8 |
|   | 1.0 | 1.02 | 23.0 | 23.5 | 26.0 | 178.2 | 249.0 |
|   | 1.25 | 1.25 | 19.6 | 19.5 | 21.5 | 116.8 | 117.4 |
| 4 | 0.5 | 0.51 | 47.9 | 51.0 | 50.9 | 592.9 | 756.6 |
|   | 0.75 | 0.78 | 35.5 | 34.8 | 33.9 | 274.0 | 288.0 |
|   | 0.85 | 0.90 | 34.3 | 32.7 | 29.4 | 250.1 | 274.7 |
|   | 1.0 | 1.04 | 29.7 | 28.7 | 25.6 | 169.3 | 212.3 |
|   | 1.25 | 1.23 | 22.0 | 22.5 | 21.9 | 115.7 | 161.0 |
| 5 | 0.5 | 0.53 | 40.6 | 41.3 | 48.7 | 520.1 | 605.0 |
|   | 0.75 | 0.82 | 29.0 | 29.5 | 31.7 | 224.2 | 290.5 |
|   | 0.85 | 0.94 | 27.1 | 27.7 | 27.7 | 216.1 | 242.2 |
|   | 1.0 | 1.04 | 24.1 | 25.2 | 25.1 | 156.0 | 187.9 |
|   | 1.25 | 1.25 | 21.9 | 21.3 | 21.1 | 127.4 | 138.2 |

As Table 8 illustrates, gas mean residence times calculated from the three different approaches differ by only a few seconds with the exception of the lowest superficial velocity at about 0.5 ft/s. The variance determined from the "Method of Moments" is consistently less than that determined from the "Peak Fit" method, but the differences generally decrease as the superficial velocity increases.

Peclet numbers provide a method of comparing and ranking different baffle configurations and, for a reacting system, can be related to sulfur conversion performance. Since three different methods were used to obtain the Peclet numbers, these results were evaluated. For all cases, the Peclet number was determined from equation 1, and the differences are the result of the method used to obtain variance and mean residence time, as noted above. For the case where the mean residence time was determined from the Pitot tube measurements, the variance from the "Method of Moments" was used to determine the Peclet number. The results for these calculations are reported in Table 9, below.

TABLE 9

| Baffle Group | $U_o$, nominal, ft/s | $U_o$ at Bed Surface, ft/s | Peclet Number from the "Method of Moments" | Peclet Number from "Peak Fit" | Peclet Number from the Pitot Tube Gas Flow Rate |
| --- | --- | --- | --- | --- | --- |
| 1 | 0.5  | 0.53 | 3.1 | 2.5 | 3.3 |
|   | 0.75 | 0.74 | 2.6 | 2.5 | 3.6 |
|   | 0.85 | 0.92 | 2.9 | 2.9 | 4.2 |
|   | 1.0  | 1.06 | 3.5 | 5.2 | 3.9 |
|   | 1.25 | 1.28 | 2.6 | 5.0 | 3.4 |
| 2 | 0.5  | 0.52 | 2.9 | 2.0 | 4.7 |
|   | 0.75 | 0.80 | 2.6 | 1.8 | 2.9 |
|   | 0.85 | 0.90 | 2.8 | 2.6 | 3.5 |
|   | 1.0  | 1.03 | 2.1 | 2.4 | 2.6 |
|   | 1.25 | 1.23 | 3.0 | 2.8 | 2.5 |
| 3 | 0.5  | 0.50 | 4.3 | 2.8 | 8.5 |
|   | 0.75 | 0.81 | 4.3 | 2.6 | 5.7 |
|   | 0.85 | 0.91 | 4.4 | 3.4 | 7.0 |
|   | 1.0  | 1.02 | 4.7 | 3.1 | 6.4 |
|   | 1.25 | 1.25 | 5.3 | 5.2 | 6.8 |
| 4 | 0.5  | 0.51 | 6.6 | 5.7 | 7.6 |
|   | 0.75 | 0.78 | 8.0 | 7.3 | 7.2 |
|   | 0.85 | 0.90 | 8.3 | 6.6 | 5.7 |
|   | 1.0  | 1.04 | 9.3 | 6.6 | 6.6 |
|   | 1.25 | 1.23 | 7.2 | 5.0 | 7.1 |
| 5 | 0.5  | 0.53 | 5.1 | 4.4 | 8.0 |
|   | 0.75 | 0.82 | 6.3 | 4.7 | 7.8 |
|   | 0.85 | 0.94 | 5.6 | 5.1 | 5.9 |
|   | 1.0  | 1.04 | 6.3 | 5.5 | 6.9 |
|   | 1.25 | 1.25 | 6.3 | 5.3 | 5.8 |

As Table 9 illustrates, the results are similar for all three methods, but those determined by the Pitot tube measured flow rates tend to generally be higher. Since, as equation 1 indicates, the Peclet number is roughly related to the mean residence time, small differences in mean residence time lead to larger differences in the calculated Peclet number. Despite these differences, the results taken as a whole indicate that benefits are obtained through both the spacing in the horizontal plane and the vertical spacing, but that the benefit is greater for spacing in the horizontal plane. Also, the use of V-shaped baffles in place of pipe baffles did not provide any significant loss of performance.

What is claimed is:

1. A desulfurization process comprising the steps of:
   (a) contacting a hydrocarbon-containing fluid stream with finely divided solid sorbent particulates comprising a reduced-valence promoter metal component and zinc oxide in a fluidized bed reactor vessel under desulfurization conditions sufficient to remove sulfur from said hydrocarbon-containing fluid stream and convert at least a portion of said zinc oxide to zinc sulfide, thereby providing a desulfurized hydrocarbon-containing stream and sulfur-loaded sorbent particulates;
   (b) simultaneously with step (a), contacting at least a portion of said hydrocarbon-containing stream and said sorbent particulates with a series of substantially horizontal, vertically spaced baffle groups comprising a plurality of substantially parallel baffles each presenting a generally V-shaped cross-section, thereby reducing axial dispersion in said fluidized bed reactor;
   (c) contacting said sulfur-loaded sorbent particulates with an oxygen containing regeneration stream in a regenerator vessel under regeneration conditions sufficient to convert at least a portion of said zinc sulfide to zinc oxide, thereby providing regenerated sorbent particulates comprising an unreduced promoter metal component; and
   (d) contacting said regenerated sorbent particulates with a hydrogen-containing reducing stream in a reducer vessel under reducing conditions sufficient to reduce said unreduced promoter metal component, thereby providing reduced sorbent particulates.

2. The desulfurization process of claim 1, further comprising contacting said reduced sorbent particulates with said hydrocarbon-containing fluid stream in said fluidized bed reactor vessel under said desulfurization conditions.

3. The desulfurization process of claim 1, wherein said hydrocarbon-containing fluid stream comprises hydrocarbons which are normally in a liquid state at standard temperature and pressure.

4. The desulfurization process of claim 1, wherein said hydrocarbon-containing fluid stream comprises a hydrocarbon selected from the group consisting of gasoline, cracked-gasoline, diesel fuel, and mixtures thereof.

5. The desulfurization process of claim 1, wherein said reduced-valence promoter component comprises a promoter metal selected from the consisting of nickel, cobalt, iron, manganese, tungsten, silver, gold, copper, platinum, zinc, ruthenium, molybdenum, antimony, vanadium, iridium, chromium, and palladium.

6. The desulfurization process of claim 1, wherein said reduced-valence promoter component comprises nickel.

7. The desulfurization process of claim 1, wherein each of said baffle groups has an open area in the range of from about 40 percent to about 90 percent of the cross-sectional area of said reactor vessel at the vertical location of that respective baffle group.

* * * * *